United States Patent [19]

Costello et al.

[11] Patent Number: 5,399,632
[45] Date of Patent: Mar. 21, 1995

[54] HYDROGENATION PROCESS FOR UNSATURATED HOMO AND COPOLYMERS

[75] Inventors: Christine A. Costello; Pamela J. Wright, both of Easton, Pa.; Donald N. Schulz, Annandale; Joseph A. Sissano, Cranford, both of N.J.

[73] Assignee: Exxon Research & Engineering Co., Florham Park, N.J.

[21] Appl. No.: 953,335

[22] Filed: Sep. 30, 1992

[51] Int. Cl.$^6$ ................................. C08F 8/04
[52] U.S. Cl. ...................... 525/339; 525/329.3; 525/330.3; 525/332.8; 525/332.9; 525/333.1; 525/333.2; 525/338
[58] Field of Search .................... 525/338, 339

[56] References Cited

U.S. PATENT DOCUMENTS

| | | |
|---|---|---|
| 3,333,024 | 7/1967 | Haefele et al. . |
| 3,595,942 | 7/1971 | Wald et al. . |
| 3,700,633 | 10/1972 | Wald et al. . |
| 3,810,957 | 5/1974 | Lunk . |
| 4,098,991 | 7/1978 | Kang ..................... 525/338 |
| 4,104,332 | 8/1978 | Zelinski ................. 525/338 |
| 4,452,951 | 6/1984 | Kubo et al. . |
| 4,501,685 | 2/1985 | Thomson et al. . |
| 4,501,857 | 2/1985 | Kishimoto et al. . |
| 4,510,293 | 4/1985 | Kubo et al. ............ 525/339 |
| 4,560,817 | 12/1985 | Bobsein et al. . |
| 4,668,773 | 5/1987 | Marks et al. . |
| 4,673,714 | 6/1987 | Kishimoto et al. . |
| 4,716,257 | 12/1987 | Marks et al. . |
| 4,801,666 | 1/1989 | Marks et al. . |
| 4,929,699 | 5/1990 | Wilson et al. . |
| 5,028,665 | 7/1991 | Hucul . |

OTHER PUBLICATIONS

Stephen F. Hahn, "An Improved Method for the Diimide Hydrogenation of Butadiene and Isoprene Containing Polymers", Journal of Polymer Science, vol. 30, 397–408 (1992).

R. A. W. Johnstone et al., "Heterogeneous Catalytic Transfer Hydrogenation and Its Relation to Other Methods of Reduction of Organic Compounds", Chem Rev. 1985, 85, 129–170.

"Basic Principles of Organic Chemistry", Roberts, et al., W. A. Benjamin, Inc., New York, 1965, pp. 169, 171, 175–177.

Primary Examiner—Bernard Lipman
Attorney, Agent, or Firm—Joseph J. Dvorak

[57] ABSTRACT

It has now been discovered that the hydrogenation of unsaturated homo and copolymers can be effectively carried out in the absence of added gaseous hydrogen by contacting the unsaturated polymer with a hydrogen donor compound in the presence of a Group VIII metal catalyst, especially a supported palladium catalyst, for a time and at a temperature sufficient to bring about the hydrogenation of the unsaturated polymer.

12 Claims, No Drawings

HYDROGENATION PROCESS FOR UNSATURATED HOMO AND COPOLYMERS

FIELD OF THE INVENTION

The present invention relates generally to the hydrogenation of unsaturated polymers. More particularly, this invention relates to a novel method for hydrogenating unsaturated double bonds in homo and copolymers without the addition of hydrogen gas.

BACKGROUND OF THE INVENTION

Unsaturated polymers have wide commercial application. For some applications, however, it is desirable to remove the double bonds in the unsaturated polymers because these double bonds tend to degrade by oxidative, thermal, and photochemical pathways. When this unsaturation is removed by hydrogenation, materials possessing greatly improved stability and weatherability are normally obtained. They then can be processed and used at higher temperatures, making them even more commercially attractive.

Many unsaturated polymers, such as polybutadiene, polyisoprene and polydiene-styrene block copolymers are made by anionic polymerization techniques. As a result, they possess narrow molecular weight distributions with the polymers being blocky in nature. For many applications, this is a critical attribute of their performance. Therefore, any hydrogenation method used to improve the stability and weatherability of such materials should cause as little chain degradation or alteration as possible. In the case of styrene/diene block copolymers, particularly, it is particularly important to be able to selectively hydrogenate the ethylenically unsaturated portion of the molecule without substantially reducing the aromatic portion of the molecule.

Experience has shown that it is difficult to hydrogenate these polymers without side reactions that cause molecular weight degradation or gelation, and also in the case of the styrene block copolymers, without substantial hydrogenation of the aromatic rings in the styrene portion of the polymer.

In addition to the foregoing problems, hydrogenation is normally accomplished by use of gaseous hydrogen in the presence of either heterogeneous or homogeneous catalysts. The transportation, storage and delivery, of course, of gaseous hydrogen does require extreme caution due to its flammability and explosivity when mixed with air or oxygen.

Accordingly, it is an object of the present invention to provide a process for hydrogenating unsaturated polymers in the absence of added gaseous hydrogen.

It is another object of the present invention to provide a process for hydrogenating unsaturated polymers without substantial molecular weight degradation, gelation or crosslinking of the unsaturated polymer.

It is another object of the present invention to provide a method for hydrogenating unsaturated diene styrene copolymers without substantial reduction of the aromatic content of the polymers.

SUMMARY OF THE INVENTION

It has now been discovered that the hydrogenation of unsaturated homo and copolymers can be effectively carried out in the absence of added gaseous hydrogen by contacting the unsaturated polymer with a hydrogen donor compound in the presence of a Group VIII metal catalyst, especially a supported palladium catalyst, for a time and at a temperature sufficient to bring about the hydrogenation of the unsaturated polymer.

DETAILED DESCRIPTION OF THE INVENTION

The process of the present invention is applicable to homo and copolymers having olefinic double bonds in their structure. Examples of particularly suitable polymers include 1,4-polybutadiene, 1,2-polybutadiene, 1,4-polyisoprene, 3,4-polyisoprene, and copolymers of polybutadiene and isoprene with vinyl aromatic monomers such as styrene, alpha-methyl styrene, vinyl naphthalene, vinyl anthracene and copolymers of butadiene and isoprene with acrylonitrile, acrylates, and the like. Also, the unsaturated polymers derived from mono-olefinic monomers exemplified by norborene are susceptible to being hydrogenated in accordance with the process of the present invention. Polypiperylene and copolymers of piperylene with vinyl aromatic, acrylonitrile and acrylate monomers exemplify other polymers having olefinic double bonds in their structures.

In the process of the present invention, an unsaturated polymer is contacted with a hydrogen donor compound. Hydrogen donor compounds are, of course, compounds that, in the presence of a suitable catalyst, transfer at least one hydrogen atom from the donor compound to a compound being reduced. Typical hydrogen donor compounds useful in the practice of the present invention include formic acid, formates, phosphoric acid, phosphonates, cyclohexene, indoline and the like. Formic acid is particularly preferred as a hydrogen donor compound in the process of the present invention.

As indicated, the unsaturated polymer and the hydrogen donor compound are contacted in the presence of a catalyst of a Group VIII metal of the Periodic Table of the Elements. The Periodic Table of the Elements referred to herein is that found on the inside cover of Lange's Handbook of Chemistry, 11th Edition, McGraw Hill Publishing Company. Indeed, noble metals are preferred, especially palladium. Also, the catalyst typically will be supported on an inert support such as carbon, $BASO_4$ and $Al_2O_3$. Thus, Pd on carbon, Pd on $BASO_4$ and Pd on $Al_2SO_3$ are particularly preferred supported catalysts used in the process of the present invention.

In general, an effective amount of catalyst is employed. Typically, the ratio of catalytic metal to olefinic double bonds will be in the range of from about 0.005:1 to about 3:1 and, preferably, about 0.012: 1 to about 1.16:1.

In carrying out the process of the present invention, the unsaturated polymer is dissolved in an unreactive solvent. Suitable solvents include hexane, toluene, cyclohexane, tetrahydrofuran and the like. Particularly preferred solvents in the process of the present invention are tetrahydrofuran and cyclohexane. In a particularly preferred embodiment of the present invention, a cosolvent is employed. Basically, any alcohol may be employed as a cosolvent; however, it is particularly preferred to use primary alcohols having the formula $CH_3(CH_2)_nOH$ where n is from 1 to 17 and ROH where R is a tertiary alkyl group having from 4 to 16 carbon atoms.

In general, the ratio of the hydrogen donor compound to the olefinic groups in the unsaturated polymer will be in the range of about 1 to 100 and, preferably, in the range of 3 to 35.

The contact time for the reactants depends, among other things, on the nature of the unsaturated homo or copolymer that is being hydrogenated, as well as the hydrogen donor compound being employed and the catalyst used. Typically, unsaturated polymers with pendant unsaturation will be hydrogenated in shorter periods of time than unsaturated polymers containing backbone unsaturation. In general, the contacting is of the order of from about 0.5 to about 24 hours.

Similarly, the contacting is conducted at a temperature sufficient to bring about reduction of the unsaturated polymer. Thus, contacting may be effected over a wide temperature range and for convenience the refluxing temperature of the solvent is frequently employed. Particularly preferred are temperatures in the range of about 30° C. to about 110° C.

The contact time and temperature can be decreased by subjecting the reaction mixture to ultrasonic sound waves during the contacting.

The invention is further illustrated by reference to the following examples.

In all the examples that follow, none of the polymers hydrogenated was found to exhibit any molecular weight degradation or gelation (as monitored by Gel Permeation Chromatography (GPC)). Also, within the error limits of the measurement, hydrogenated materials had the same polydispersity indices of the parent polymers.

EXAMPLE 1-1.4

1.4 Polybutadiene (PBD) Hydrogenation Using Cyclohexane/Ethanol as A Solvent

A 250 cc 3-necked round bottom flask was fitted with a condenser (connected to a static head of $N_2$), thermometer and a septum. 1.02 g of 1,4 PBD (Mn=65,317; PDI=1.04) and 100 ml of cyclohexane were charged to the flask and stirred until dissolved. Ethanol (24 ml.; 0.41 moles) and 10% Pd/C (1.5055 g; 1.415 mmoles active Pd) were added and likewise stirred. The mixture was heated to 80° C. (until reflux). Formic acid (2.95 cc; 78 mmol) was slowly added via syringe through the septum. (If the formic acid is added too quickly, the reaction mixture foams out of the condenser.) The reaction proceeded for 24 hours. The following day, the reaction mixture was filtered (through a Millipore ® FH filter) hot using a pressure filtration apparatus (Fisherbrand 304S.S., Catalogue #09-753-25A) which was wrapped with heating tape so that the reaction mixture remained at approximately 80° C. The filtrate was reduced to half its volume using a rotary evaporator. The polymer was isolated by adding methanol to this solution, collected, and dried in a vacuum oven (60° C. and $10^{-3}$ torr). The conversion of the material was determined to be 40.4% by $^1H$ NMR spectroscopy.

EXAMPLES 2 AND 3

1,4 PBD Hydrogenation Using Toluene/Ethanol or Heptane Ethanol

The procedure of Example 1 was followed, using toluene/ethanol or heptane/ethanol as solvent and similar results were obtained.

EXAMPLES 4 TO 7

1,4 PBD Hydrogenation Using Cyclohexane and Alcohols of Varying Chain Lengths as Solvents Reactions were run as in Example 1, except that primary alcohols of increasing chain lengths were used instead of ethanol.

TABLE 1

Effect of Alcohol Chain Length on the Hydrogenation of 1,4 PBD (Cosolvent is Cyclohexane)

| Example | R—OH Used | % Hydrogenation |
|---|---|---|
| 4 | $CH_3(CH_2)_4OH$ | 75.8 |
| 5 | $CH_3(CH_2)_7OH$ | 74.4 |
| 6 | $CH_3(CH_2)_9OH$ | 80.0 |
| 7 | $CH_3(CH_2)_{17}OH$ | 100.0 |

EXAMPLES 8 TO 12

In these examples, the procedure of Example 1 was followed, using toluene and an alcohol as cosolvent. A summary is given in Table 2.

TABLE 2

Effect of Alcohol Chain Length on 1,4 PBD Hydrogenation (Toluene Used as Cosolvent)

| Example | R—OH Used | % Hydrogenation |
|---|---|---|
| 8 | $CH_3(CH_2)OH$ | 30.5 |
| 9 | $CH_3(CH_2)_4OH$ | 21.8 |
| 10 | $CH_3(CH_2)_7OH$ | 32.9 |
| 11 | $CH_3(CH_2)_9OH$ | 46.9 |
| 12 | $CH_3(CH_2)_{17}OH$ | 74.2 |

EXAMPLE 13

Two Phase 1,2 PBD Hydrogenation

This example will demonstrate the generality of the reaction. In the same reaction set-up used in Example 1, 1.01 g of 1,2 PBD (Mn=47,497; PDI=1.02) was dissolved with 30 ml cyclohexane under $N_2$. Octadecanol (1.03 g; 3.8 mmol), then 1.50 g (1.41 mmol) 10% Pd/C was added and dissolved. The reaction mixture was heated to reflux, then 5.90 ml (156 mmol) formic acid was slowly added over a 20 to 30 minute period and reacted for 24 hours. The next day the reaction mixture was filtered hot as described above and the polymer isolated by addition of methanol. After drying, the $^1H$ NMR spectrum indicated that the reaction had gone to 93% conversion. As in previous examples, there was no evidence for gel formation; the product was completely soluble in THF. Furthermore, GPC analysis indicated that there was no change in the polydispersity indices of hydrogenated samples. With the exception of elution time, the GPC traces of the parent 1,2 PBD and the H-1,2 PBD are indistinguishable; thus, there must not be any deleterious side reactions during hydrogenation.

EXAMPLE 14

The procedure of Example 13 was followed, except 0,276 g (3.72 mmol) of tert-butyl alcohol was used instead of 1-octadecanol.

EXAMPLE 15

Two Phase Polyisoprene (PIP) Hydrogenation

This example will demonstrate that even sterically hindered polydienes can be successfully hydrogenated. In a similar manner, 1.0 g PIP (Mn=38,774; PDI=1.18) was dissolved in 34 ml cyclohexane and octadecanol (0,830 g; 3.07 mmol). Pd/C catalyst (1.2 g; 1.13 mmol active Pd) was added and stirred until dispersed. The reaction mixture was heated to reflux and formic acid (4.70 ml; 125 mmol) was added dropwise. The reaction proceeded for 72 hours. At the end of the reaction period, 30 ml of toluene was added to the mixture and it was filtered hot as described above. The polymer was isolated as described above. The conversion, determined by $^1$H NMR was 94%. Again, GPC traces of the parent polymer were superimposable on the hydrogenated material, supporting absence of chain coupling, gelation, or degradation.

EXAMPLE 16

Three Phase PIP Hydrogenation

PIP hydrogenation was carried out as described above, but no alcohol was employed. Thus, 0.50 g PIP was dissolved in 15 cc cyclohexane, followed by addition of 10% Pd/C (0.752 g; 0.706 mmol). The reaction mixture was heated to reflux (81° C.), then formic acid (2.95 cc; 78 mmol) was added slowly dropwise as described above. The reaction proceeded for 24 hours and was worked up as described above. Conversion was 99%, by $^1$H NMR.

EXAMPLES 17, 18 AND 19

Use of Other Hydrogen Donors

Reactions were run on 1,2 PBD as described above, except that other hydrogen donors were used in place of formic acid. Results are given in Table 3.

TABLE 3

| | 1,2 PBD Hydrogenation Using Other Hydrogen Transfer Agents | | | | | |
|---|---|---|---|---|---|---|
| Example | Mass Polymer Used (g) | Alcohol, Amount Used (g) | Active Pd (mmol) | Hydrogen Donor | Amount Used (mmol) | % Hydrogenation |
| 17 | 1.01 | (CH$_3$)$_3$COH, 0.28 | 1.421 | Indoline | 188 | 53.7 |
| 18 | 1.00 | None | 1.507 | Piperidine | 79 | 82.2 |
| 19 | 1.14 | None | 1.620 | Cyclohexene | 85 | 7.7 |

EXAMPLES 20, 21 AND 22

Polystyrene-Isoprene Diblock Copolymer (d$_8$-St-b-I) Hydrogenation

These examples demonstrate the selectivity of the reaction for the polydiene portion of styrene-diene block copolymers. Reactions were run as described above, using a Poly d$_8$-St-b-I diblock copolymer (d$_8$ styrene block, Mn=10,000; isoprene block, Mn=7,500; PDI=1.03) in which the styrene portion is deuterated. The $^1$H NMR spectrum of this material is that of straight PIP. No interference from styrene is present, facilitating interpretation. If the spectrum of the hydrogenated diblock in the same as that of hydrogenated PIP, then it can be assumed that the d$_8$ PS block had not been hydrogenated. Both two and three phase reactions were run. Reactions are summarized in Table 4 below.

There was no indication of any styrene hydrogenation in the $^1$H NMR of the hydrogenated materials. Also, within experimental error, there were no changes in the PDIs of the hydrogenated materials compared to the parent diblock materials.

TABLE 4

| | Poly-d$_8$-St-b-I Hydrogenation | | | | |
|---|---|---|---|---|---|
| Example | Mass Polymer Used (g) | Alcohol, Amount Used (g) | Active Pd (mmol) | Formic Acid (mmol) | % Hydrogenation |
| 20 | 0.504 | Octadecanol, 0.504 | 0.470 | 63 | 85 |
| 21* | 0.507 | None | 0.709 | 52 | 81 |
| 22** | 0.508 | None | 0.713 | 52 | 76 |

*50/50 toluene/cyclohexane used as solvent
**50/50 cyclohexene/cyclohexane used as solvent

EXAMPLE 23

Polyisoprene (PIP) Hydrogenation Using Ultrasonic Agitation

A reaction was run as in Example 16, except that the reaction was run under lower temperatures and shorter reaction times using an Astrason ® Table Top Ultrasonic Cleaner (Model 13HT), manufactured by Heat Systems, Farmingdale, N.Y. This cleaner operates at 60 KHz and delivers 200 watts ultrasonic power. Specifically, 2.99 g polyisoprene (Mn=46,750, Mw/Mn=1.14) was dissolved in 90 cc cyclohexane. 10% Pd/C (3.57 g; 3.35 mmol) was added and stirred for about ½ hour. At this point, the reaction flask was placed in the ultrasonic cleaning bath. The average temperature of the bath (26.8° C.) was maintained by adding cold water to the bath at regular intervals. Formic acid (14 cc; 17.08 g; 371 mmol) was added dropwise over a ½ hour period with the cleaning bath turned "on". After a reaction period of only 6 hours, an aliquot of the reaction mixture was taken and filtered as previously described. After the normal workup, $^1$H NMR analysis indicated that the degree of hydrogenation was already 53.4%. GPC analysis indicated no change in the molecular weight distribution of the sample (PDI=1.08) within the experimental error of the instrument. This example demonstrates that hydrogenation proceeds to a considerable extent with mild temperatures and short reaction times in the presence of ultrasound.

What is claimed is:

1. A method for hydrogenating olefinic double bonds in unsaturated homo and copolymers comprising:
   contacting an unsaturated polymer having olefinic double bonds with a hydrogen donor compound in the presence of a Group VIII metal catalyst for a time and at a temperature sufficient to hydrogenate at least some of the olefinic double bonds in the polymer.

2. The method of claim 1 wherein the ratio of hydrogen donor compound to olefinic double bonds in the polymer is about 1 to about 100.

3. The method of claim 2 wherein the Group VIII metal catalyst is a supported palladium metal catalyst.

4. The method of claim 3 wherein the hydrogen donor compound is selected from the group consisting of formic acid, formates, phosphoric acid, phosphonates, cyclohexene and indoline.

5. The method of claim 4 wherein the polymer is dissolved in a solvent selected from the group consisting of hexane, toluene, cyclohexane, and tetrahydrofuran.

6. The method of claim 5 wherein the solvent contains a cosolvent selected form the group consisting of alcohols having the formula $CH_3(CH_2)_nOH$ where n is from 1 to 17 and R—OH where R is a tertiary alkyl group of from 4 to 16 carbon atoms.

7. The method of claim 6 wherein the hydrogen donor compound is formic acid.

8. The method of claim 7 wherein contacting is at a temperature in the range of from about 30° C. to about 110° C.

9. The method of claim 8 including subjecting the polymer, hydrogen donor compound, solvent and catalyst to ultrasonic sound waves.

10. The method of claim 8 wherein the contacting is from about 1 to about 24 hours.

11. The method of claim 6 wherein the unsaturated polymer is selected from the group consisting of 1,2- and 1,4-polybutadiene, 1,4- and 3,4-polyisoprene, copolymers of butadiene and isoprene with vinyl aromatic monomers, acrylonitrile and acrylates.

12. A method for hydrogenating olefinic double bonds in unsaturated polymers in the absence of added gaseous hydrogen and without substantial molecular weight degradation or gelation of the unsaturated polymer comprising:

dissolving a polymer having olefinic double bonds in a solvent, the polymer being selected from the group consisting of 1,2- and 1,4-polybutadiene, 1,4- and 3,4-polyisoprene, copolymers of butadiene and isoprene with vinyl aromatic monomers, acrylonitrile and acrylates and the solvent being selected from the group consisting of hexane, toluene, cyclohexane, tetrahydrofuran and mixtures of the foregoing with an alcohol having the formula $CH_3(CH_2)_nOH$ and R—OH where n is from 1 to about 17 and R is a tertiary alkyl group having from about 4 to about 16 carbon atoms, thereby forming a polymer solution;

adding to the polymer solution a supported palladium catalyst and a hydrogen donor compound selected from the group consisting of formic acid, formates, phosphoric acid, phosphonates, cyclohexene and indoline, the ratio of hydrogen donor compound to olefinic double bonds being in the range of from about 1 to about 100, thereby forming a heterogeneous mixture;

heating the mixture at a temperature in the range of from about 30° C. to about 110° C. for about 0.5 to about 24 hours whereby the olefinic double bonds are hydrogenated without substantial degradation or gelation of the polymer.

* * * * *